United States Patent [19]

Palmer

[11] Patent Number: 5,021,128
[45] Date of Patent: Jun. 4, 1991

[54] WATER DISTILLATION SYSTEM AND METHOD WITH CONTROLS

[75] Inventor: David G. Palmer, Lincoln, Nebr.

[73] Assignee: Pure Water, Inc., Lincoln, Nebr.

[21] Appl. No.: 160,132

[22] Filed: Feb. 25, 1988

[51] Int. Cl.$^5$ .............................................. B01D 3/42
[52] U.S. Cl. ........................................ 203/1; 203/4; 203/7; 203/10; 203/DIG. 11; 203/DIG. 17; 203/DIG. 18; 202/181; 202/206; 202/241; 137/392; 340/620
[58] Field of Search ............... 202/181, 206, 202, 241; 340/620; 137/392; 203/1, 10, 6, 7, 4, DIG. 18, 3, DIG. 17, DIG. 7, DIG. 11

[56] References Cited

U.S. PATENT DOCUMENTS

| | | | |
|---|---|---|---|
| 2,079,897 | 5/1937 | Brown | 202/196 |
| 2,368,665 | 2/1945 | Kohman et al. | 203/49 |
| 2,388,599 | 11/1945 | Cleaver et al. | 202/174 |
| 3,055,810 | 9/1962 | Skow | 202/181 |
| 3,207,282 | 9/1965 | Norris, Jr. | 194/15 |
| 3,269,919 | 8/1966 | Baily et al. | 202/202 |
| 3,350,279 | 10/1967 | Tolchin | 202/83 |
| 3,445,344 | 5/1969 | Morton | 202/176 |
| 3,696,003 | 10/1972 | Fitch et al. | 202/160 |
| 3,825,491 | 7/1974 | Sanchez | 202/176 |
| 3,826,718 | 7/1974 | Takayasu | 203/2 |
| 3,896,004 | 7/1975 | Rodgers | 202/167 |
| 3,930,959 | 1/1976 | Kirschmann | 202/181 |
| 4,045,293 | 8/1977 | Cooksley | 203/10 |
| 4,110,170 | 8/1978 | Kirschman et al. | 202/160 |
| 4,205,237 | 5/1980 | Miller | 340/620 |
| 4,259,982 | 4/1981 | Bartels | 137/392 |
| 4,482,891 | 11/1984 | Spencer | 340/620 |
| 4,525,243 | 6/1985 | Miller | 202/181 |
| 4,575,404 | 3/1986 | Goto et al. | 203/1 |
| 4,600,844 | 7/1986 | Atkins | 307/118 |
| 4,601,789 | 7/1986 | Bjorklund | 202/167 |
| 4,687,550 | 8/1987 | Wong | 202/165 |
| 4,888,097 | 12/1989 | Palmer et al. | 203/1 |

OTHER PUBLICATIONS

Copending Application Ser. No. 030,353 for a Water Supply System, filed Mar. 26, 1987 (drawings enclosed).
Copending Application Ser. No. 024,257 for a Water Purification Method & Apparatus, filed Mar. 10, 1987 (drawings enclosed).
Instruction booklet by Pure Water, Inc. entitled "Aqua D Mark II Instructions for Assembly & Operation", Copyright 1985.
Publication by Pure Water, Inc. entitled MidiStill-MidiStill D Instructions for Assembly & Coperation, Copyright 1981.
Copending Application Ser. No. 166,509 for a Control For Modular Water Distiller, filed Mar. 10, 1988 (drawings enclosed).

Primary Examiner—Wilbur Bascomb
Attorney, Agent, or Firm—Price, Heneveld, Cooper, DeWitt & Litton

[57] ABSTRACT

A control for a water distillation apparatus admits untreated feed water to the boiling tank in response to a demand for the production of distilled water and operates the heater to produce steam. Level probes in the boiling tank monitors the level of untreated water in the boiling tank and admits more feed water as necessary. When demand for production of distilled water has ceased, the heater is deenergized and the boiling tank is filled to dilute the residual water in the tank and lower its temperature prior to drainage to prevent damage to a plastic house drain. In a preferred embodiment, feed water is admitted to the boiling tank in large batches and the production of distilled water continues uninterrupted until the entire batch is distilled to conserve heat energy even if demand ceases during such batch distillation. A cleaning mode is provided to remove scale from the interior of the boiling tank with a simplified manual cleaning procedure. A steam cleaning mode for the distilled water holding tank is self-terminating to avoid damage to the outlet pump.

22 Claims, 4 Drawing Sheets

WATER DISTILLATION SYSTEM AND METHOD WITH CONTROLS

BACKGROUND OF THE INVENTION

This invention relates to water purification systems and in particular to a control for a system of the type that purifies water by converting it into steam and condensing the steam back into water.

Water distillation systems are well-known in the art and include a boiling tank having an inlet for admitting untreated feed water to the tank and heating means for heating the untreated water to produce steam. As steam is generated by the boiling tank, the minerals and other impurities in the residue water increase in concentration. Periodically, it is necessary to remove the residue by draining. In a water distillation unit designed for domestic home use, the drain commonly discharges the residue water into the house drain. With the advent of polyvinylchloride plastic pipe for plumbing systems, it is necessary to reduce the temperature of the residue water before discharging it to the drain. Accordingly, one object of the present invention is to provide an efficient and inexpensive means for reducing the temperature of the residue water before it is discharged to drain.

Even if the residue is periodically discharged to drain, mineral scale will be deposited on inner surfaces of the tank and outer surfaces of the heater. Accordingly, it is necessary to periodically shut down the unit and descale the interior of the boiling tank by filling the tank with water having descaling chemicals added thereto and, after a soaking period, draining the cleaning liquid and rinsing the tank. It is an object of the present invention to provide a control having a cleaning mode that minimizes the complexity of the procedure performed by the user and that adds very little to the cost of the control.

The primary purpose of a water distillation unit is to produce distilled water and accumulate this water in a holding tank until needed for use. Consumers expect that such water will be of very high quality. If the water in the holding tank is contaminated by the condition of the holding tank then water quality may be diminished. Accordingly, it is known to disable the condensing portion of the water distillation apparatus in order to provide steam from the boiling tank directly to the holding tank in order to destroy microorganisms that may be established in the tank. The difficulty with known units having such a steam cleaning cycle is that, if the user forgets to reactivate the condensing means, then the steam will eventually condense within the holding tank providing a buildup of very hot water in the holding tank. If the holding tank outlet pump is operated by the user after inadvertently neglecting to discontinue the steam cleaning mode, it is possible that the hot water may cause damage to the holding tank outlet pump. Accordingly, it is an object of the present invention to provide an inexpensive control for protecting a water distillation unit against the failure of the user to discontinue the steam cleaning mode.

Another difficulty with water distillation units is that the addition of relatively cold untreated feed water to the boiling tank tends to rapidly lower the temperature of the interior of the tank. This lowering of temperature creates a vacuum within the boiling tank which tends to draw water already condensed in the condenser and steam previously produced back into the boiling tank where it will condense back into water. Therefore, the addition of feed water creates inefficiencies in the operation of the unit which results in increased energy consumption per unit of water produced. Accordingly, it is an object of the present invention to provide a control for a water distillation unit which carefully controls the frequency and amount of feed water admission to the boiling tank in order to reduce the detrimental affects described above.

SUMMARY OF THE INVENTION

The above objects are fulfilled by a control for a water distillation unit which determines whether a demand for the production of distilled water exists. The control may determine this demand by monitoring the level of distilled water in the holding tank. If it is determined that a demand for the production of distilled water exists, then the control admits untreated feed water to the boiling tank to a predetermined level and operates the heating means in order to produce steam. Level determining means in the boiling tank monitors the level of untreated water in the boiling tank and admits more feed water as necessary. When the control determines that the demand for the production of distilled water has ceased, the heating means is deenergized and feed water is admitted to the boiling tank until the level of water in the boiling tank is increased to a predetermined high level. The drain valve is then opened and the contents of the boiling tank are drained.

In a preferred embodiment of the invention, when a demand for the production of distilled water exists, feed water is added cyclically to the boiling tank in large batches that substantially fill the boiling tank. The control monitors the demand for distilled water. If a demand exists, the heater is energized and steam is produced until the water level in the boiling tank reaches a predetermined low level.

When demand ceases prior to the level of water in the boiling tank reaching the high level during the next batch fill, the heater is not reenergized. Rather, the drain valve is opened, with the boiling tank full, and the contents of the boiling tank are emptied. This preferred embodiment assures that maximum dilution of the hot residue water in the boiling tank occurs because the level of hot water in the tank is always reduced to the predetermined low level before being refilled. This also lowers the water temperature below the point at which damage to a plastic house drain may occur.

Even if the demand for the production of distilled water ceases during the production of steam, the production of steam will continue until the entire water batch is converted to steam, i.e., until the predetermined low level is achieved, thus conserving heat energy already present in the water. Further, by evaporating water only in batches, the admittance of feed water, which creates a vacuum that induces the return of steam to the boiling tank, occurs less frequently in order to reduce inefficiencies. Accordingly, in the preferred embodiment, excess holding capacity is provided in the holding tank above &:he level at which demand for the production of distilled water ceases in order to store up to one additional "batch" of distilled water which may be produced after the demand for the production of distilled water ceases.

In order to periodically clean mineral scale from the interior of the boiling tank and the exterior of the heater, the control includes a manual switch allowing selection of either a production mode, in which the production of distilled water occurs, or a cleaning mode. In the cleaning mode, the distillation apparatus is deenergized and the feed water admission means and drain means are controlled to fill the boiling tank with water, allow manual addition of descaling chemicals, and stay quiescent for a soaking period. Draining of the cleaning solution and subsequent refilling and draining to rinse the boiling tank, followed by refilling to allow resumption of production of distilled water is also accomplished in the cleaning mode.

Upon installing the water distillation unit, or periodically thereafter, it may be desirable to steam clean the interior of the holding tank. In order to do so, a steam cleaning mode control is provided. The steam cleaning mode is controlled by a manually resettable thermostat which, when reset, disables the condenser air cooling fan so that the steam does not completely condense in the condenser. Rather, the steam is provided directly to the holding tank to destroy microorganisms therein. The thermostat, which is mounted in the holding tank, senses the increased temperature in the holding tank resulting from a buildup of live steam. Once the holding tank temperature sensing thermostat senses a sufficiently high temperature, the condenser air-cooling fan is reenergized to resume production of distilled water.

In one embodiment of the invention, the level monitor for the boiling tank includes a double-pole switch that is actuated by a float within the boiling tank when the level reaches a predetermined high level. In order to provide a more forceful actuation of this switch, the actuating arm extends from a pivot shaft laterally opposite from the direction the float extends from this shaft. Thus, the weight of the actuating arm moving downwardly will enhance the force exerted by the buoyancy of the float to actuate the switch.

These and other related objects, advantages and features of this invention will become apparent upon review of the following specification in conjunction with the drawings.

DESCRIPTION OF THE PREFERRED EMBODIMENT

Figure 1:
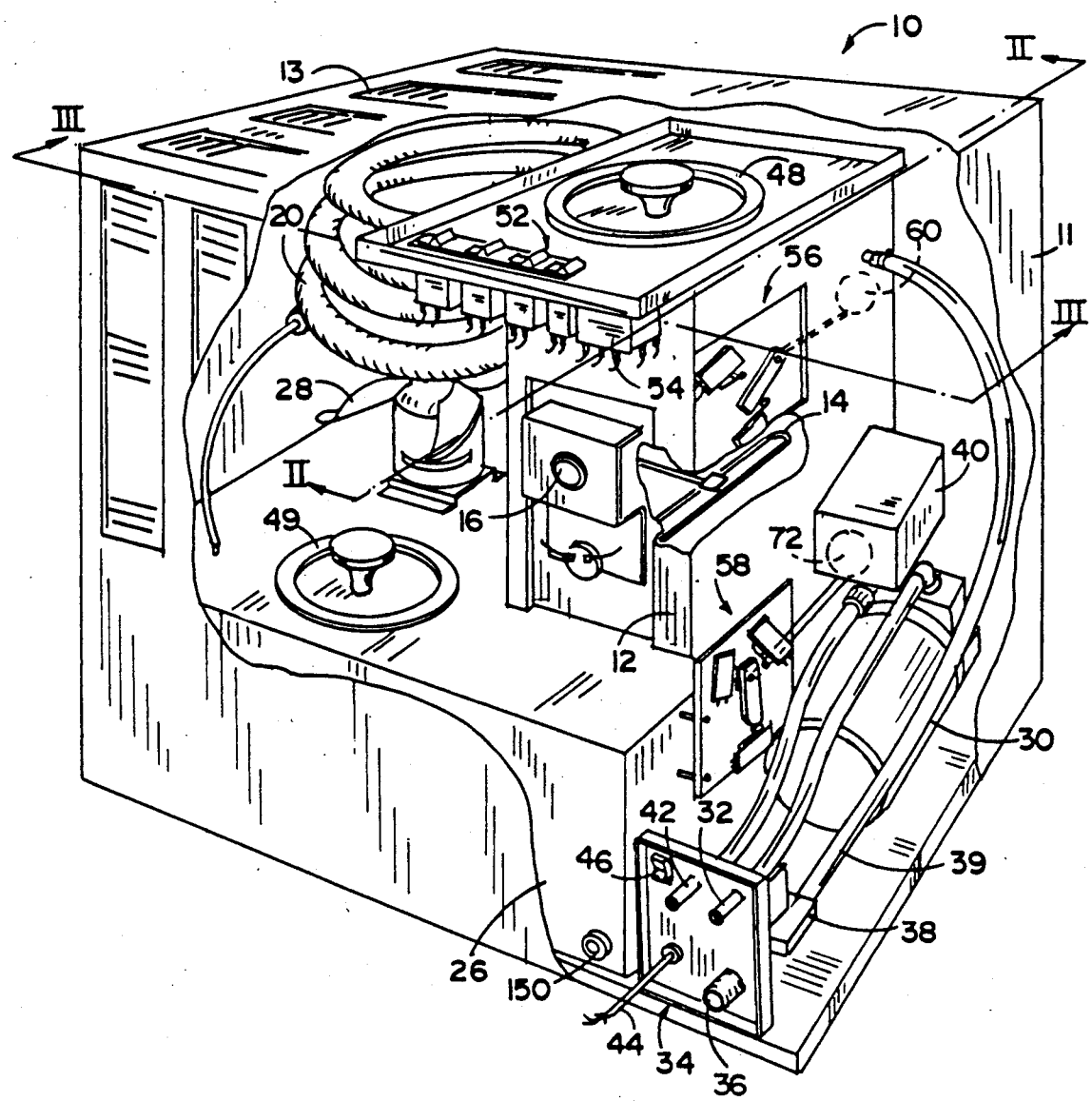
FIG. 1 is a perspective view of a water distillation unit according to the invention taken from the left rear corner with the shroud partially cut away to show the interior of the unit.
Figure 8:
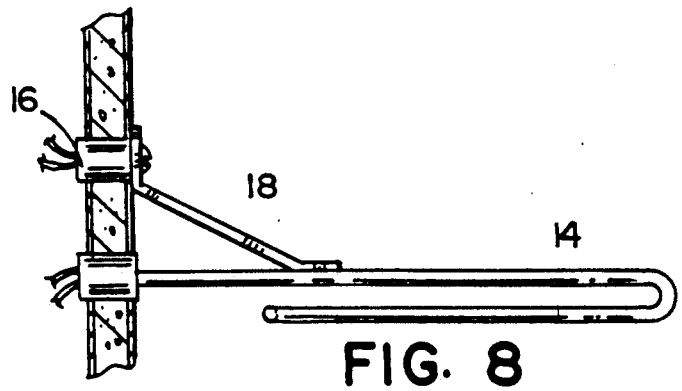
FIG. 8 is a partial elevational view of the interior of the boiling tank showing the heating element and temperature overload protector.

Referring now specifically to the drawings, and the illustrative embodiments depicted therein, a water distillation unit 10 is shown in FIG. 1 including a shroud 11 having louvers 13 for air circulation between the interior and exterior of the shroud. Unit 10 further includes a boiling tank 12 having heating means generally shown at 14 in the interior of the boiling tank for converting untreated water in the boiling tank to steam. In a preferred embodiment, heating means 14 is a conventional electrical calrod heating element (FIG. 8). A boiling tank overload thermostat 16 is mounted to a wall of the boiling tank and is thermally associated with heating means 14 by a conducting strip 18 between heating means 14 and thermostat 16. The purpose of thermostat 16 is to disable the control if the temperature of heating means 14 exceeds a desirable level, as may occur if the water level in the boiling tank drops below the heating means.

Figure 3:
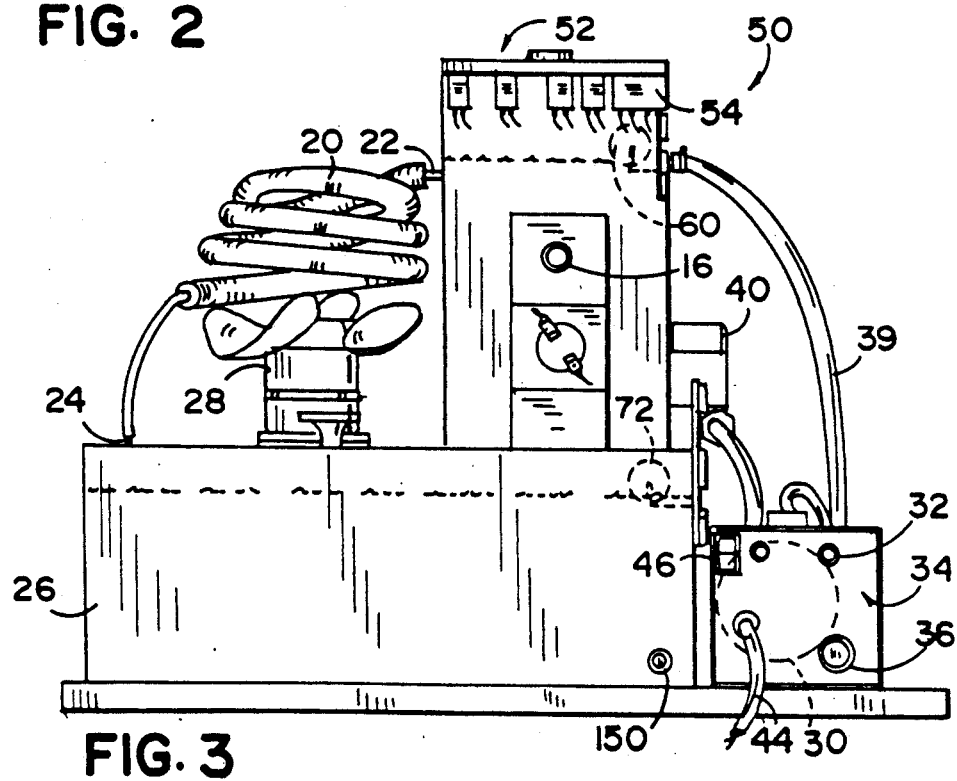
FIG. 3 is an elevation taken along the line III—III in FIG. 1 with the shroud removed.

Water distillation unit 10 further includes a coil-type, finned condenser 20 which is illustrated as having a first end portion 22 connected to a top portion of the boiling tank 12 and a second end portion 24 connected to a holding tank 26 (FIG. 3). A condenser cooling fan 28 moves air over and around condenser 20 to remove heat extracted from the steam condensing to distilled water. A distilled water outlet pump 30 is connected to receive water from holding tank 26 and to discharge water through a distilled water outlet fitting 32 located on a hookup panel 34. A boiling tank access cover 48 and holding tank access cover 49 provide access to the interior of the tanks for maintenance and inspection purposes.

A feed water inlet fitting 36 is connected to a feed water inlet solenoid-operated valve 38 and from there to boiling tank 12 via tube 39. A motor-operated drain valve 40 has an inlet connected to a lower portion of boiling tank 12 and an outlet connected to a drain fitting 42 on hookup panel 34. Hookup panel 34 further contains a power connection 44 to provide power to unit 10 from a 110 volt, house supply and an on/off power switch 46 to control power from power connection 44 to a control assembly generally shown at 50 (FIG. 3). Control assembly 50 generally includes a plurality of manually operable switches generally shown at 52 and electromechanical relays generally shown at 54. Control assembly 50 further includes a boiling tank water level monitor assembly 56 and a holding tank level monitor assembly 58 (FIG. 2).

Figure 2:
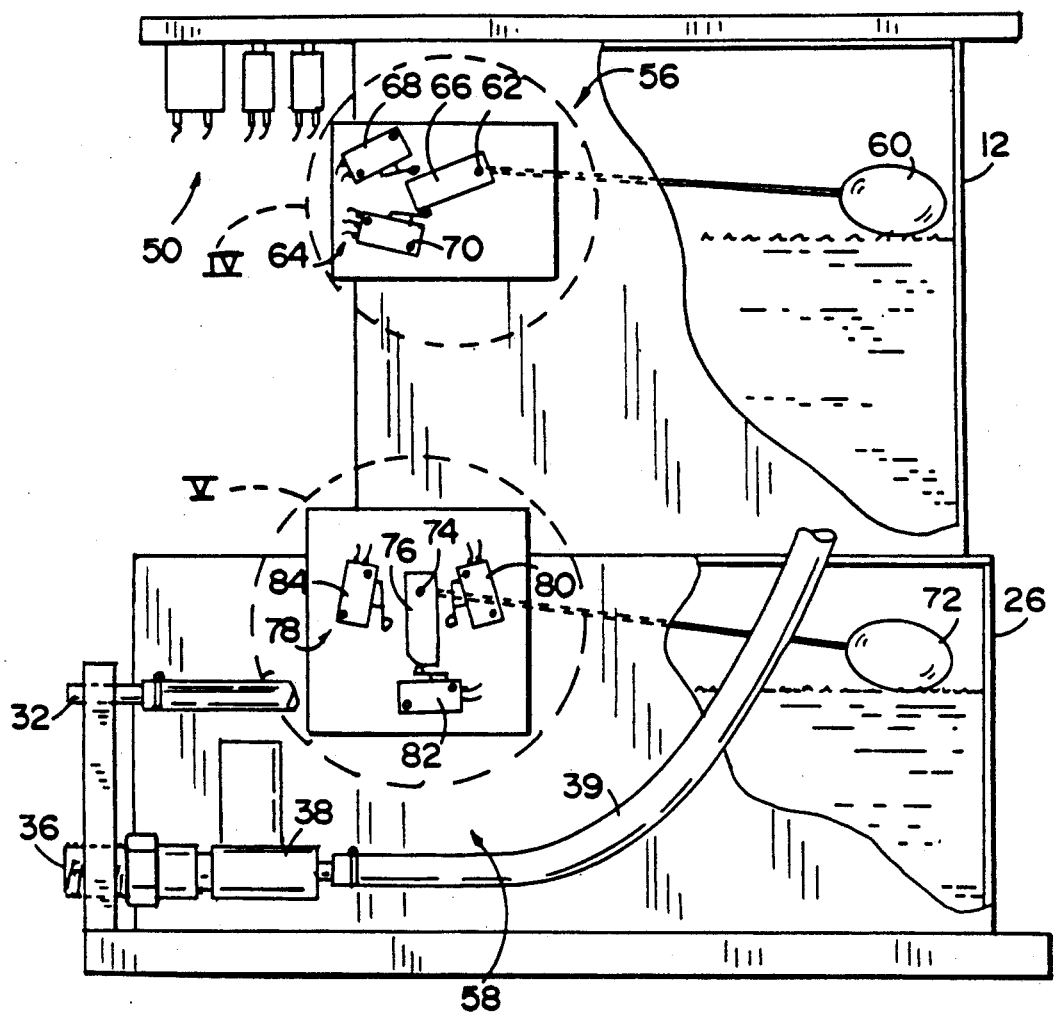
FIG. 2 is an elevation shown partially in section taken along the line II—II in FIG. 1 with the shroud removed.
Figure 4:
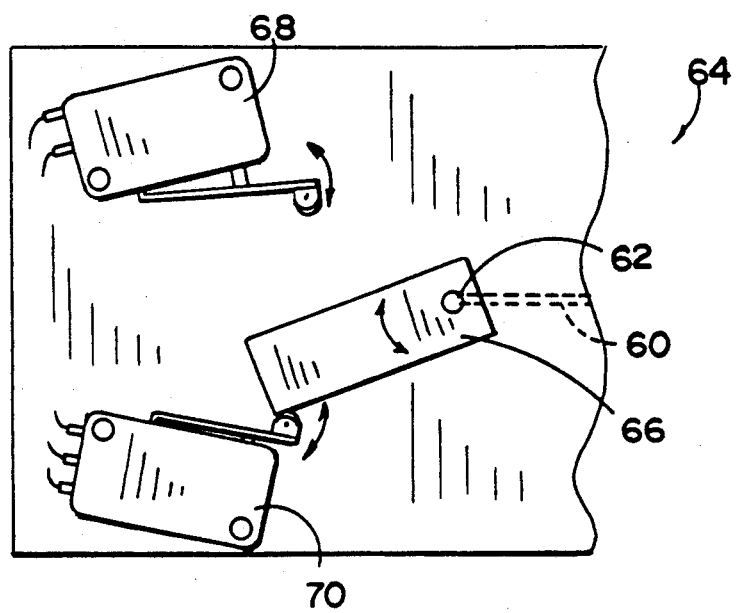
FIG. 4 is an enlarged elevation of the boiling tank switch assembly.

As illustrated in FIGS. 2 and 4, boiling tank water level monitor 56 includes a boiling tank float 60 which extends from a shaft 62, which penetrates and is rotatably journaled with a sidewall of boiling tank 12. A boiling tank switch assembly 64 is mounted to an exterior wall of boiling tank 12 and includes a switch actuator arm 66 rigidly affixed to shaft 62. Switch actuator arm 66 extends from shaft 62 in a lateral direction, as viewed in FIG. 2, generally opposite to the lateral direction that boiling tank float 60 extends from shaft 62, for reasons that will be explained in detail below. Switch assembly 64 further includes a boiling tank low level switch 68 which is mounted in relationship to actuator arm 66 and float 60 to be actuated when the level of untreated water and boiling tank 12 drops to a predetermined low level. Switch assembly 64 further includes a boiling tank high level switch 70 which is mounted in relationship to actuator arm 66 and float 60 to be actuated when the level of untreated water in boiling tank 12 increases to a predetermined high level. Switches 68 and 70 are conventional micro switches.

Boiling tank high level switch 70 is of the double pole, single throw configuration.

Figure 5:
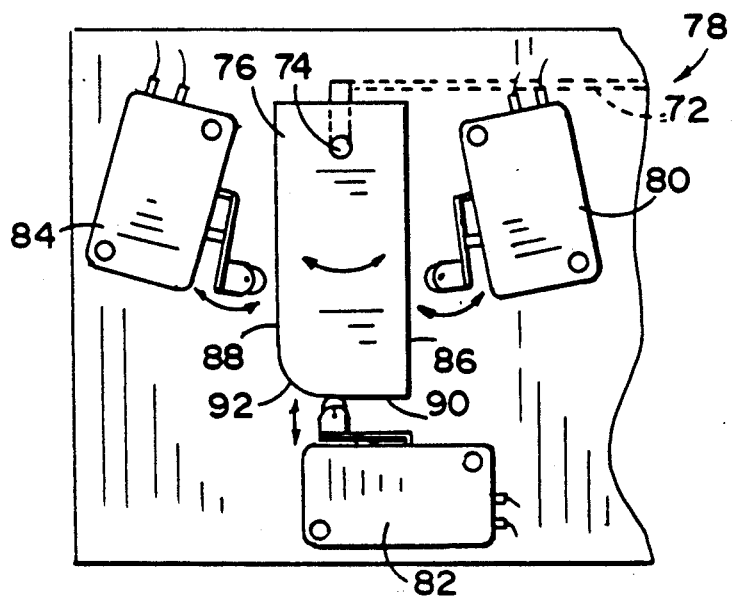
FIG. 5 is an enlarged elevation of the holding tank switch assembly.

As illustrated in FIGS. 2 and 5, holding tank water level monitor assembly 58 includes a holding tank float 72 mounted to a shaft 74 which penetrates and is journaled with a sidewall of holding tank 26. A switch actuator arm 76 is rigidly connected to shaft 74 external of the holding tank. Holding tank level monitor 58 further includes a holding tank switch assembly 78 operatively associated with actuator arm 76. Holding tank switch assembly 78 includes a holding tank high level switch 80 which is actuated by arm 76 when the level of distilled water in holding tank 26 rises to a predetermined high level. Switch assembly 78 further includes a holding tank demand switch 82 which is actuated by arm 76 when the level of distilled water in holding tank 26 drops to or below an intermediate level indicative of the need to produce additional distilled water to maintain a sufficient supply of water in holding tank 26. Holding tank switch assembly 78 further includes a holding tank low level switch 84 which is actuated by arm 76 when the level of distilled water in tank 26 decreases to a predetermined low level. As will be explained in more detail below, switch 84 is optional and may be provided to protect the distilled water outlet pump from operating without sufficient water in the holding tank.

Holding tank switch actuator arm 76 includes opposite side surfaces 86 and 88 for actuating high and low level switches 80 and 84, respectively. Actuator arm 76 further includes an end surface 90 which is generally flat with a rounded portion 92. As the level of water drops in holding tank 26, arm 76 will rotate clockwise, as viewed in FIG. 5, and rounded portion 92 will approach demand switch 82 from the right side. As the level of water continues to drop, surface 92 will eventually actuate switch 82. If the demand for distilled water exceeds the production rate of the unit, the water level in holding tank 26 will continue to drop. As the level of water continues to drop, end surface 90 will maintain demand switch 82 in an actuated condition regardless of the level to which the water level further drops, even if all water is removed from holding tank 26 at which time low level switch 84 is also actuated.

Figure 6:
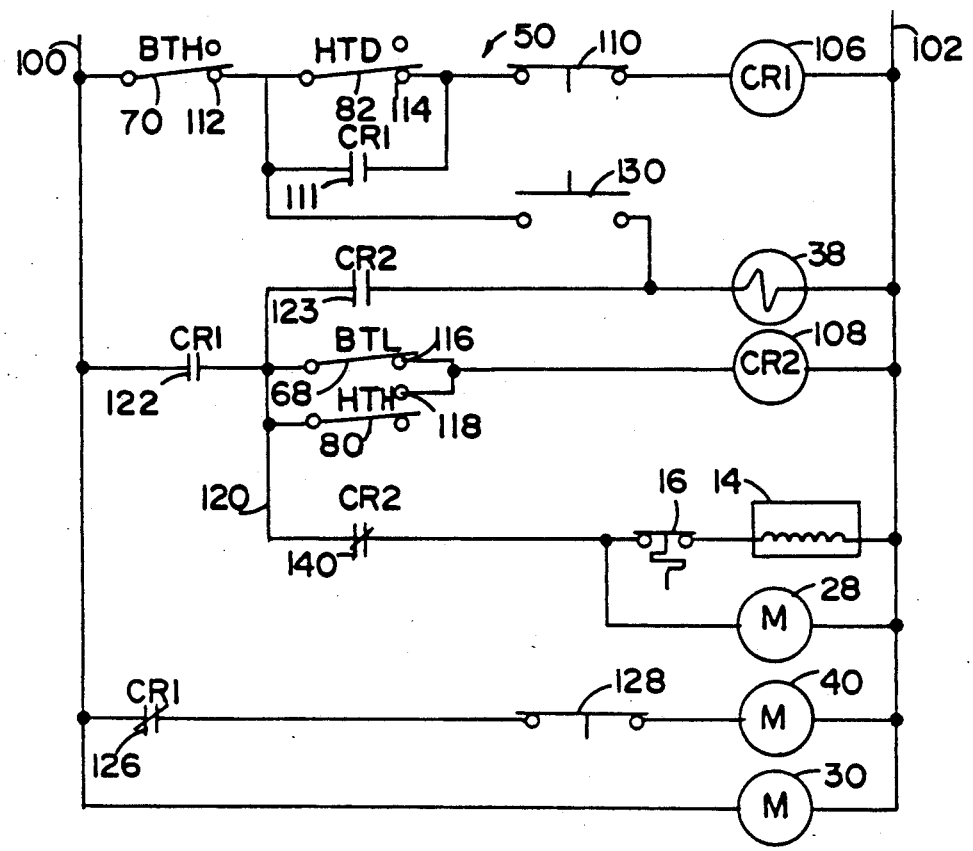
FIG. 6 is an electrical schematic diagram of an embodiment of a control according to the invention.

Referring now to FIG. 6, a first embodiment of a control according to the invention will be described in detail. 110 Volt AC power is applied to control 50 over power lines 100 and 102. Control 50 further includes relays 106 and 108 which are designated CR1 and CR2, respectively. In the illustrative embodiment, relays 106 and 108 are shown as electromechanical devices. However, electronic switches would function equally well. Relay CR1 is connected in series with power lines 100 and 102 through boiling tank high level switch 70 (BTH), holding tank demand switch 82 (HTD) and a mode switch 110, whose function will be explained in detail below. Switch 70 has a first contact 112 that is engaged by its movable contact when the level in the boiling tank is below a predetermined high level. When the level in the boiling tank reaches the predetermined high level, the movable contact moves out of engagement with contact 112 and switch 70 becomes open-circuited. Similarly, switch 82 includes a contact 114 that is engaged by the movable contact when the level of distilled water in the holding tank is at or below an intermediate level. When the level of distilled water in the holding tank exceeds this intermediate level, switch 82 becomes open-circuited. A normally open contact 111 from relay CR1 is connected electrically parallel with switch 82 and serves to keep relay CR1 energized, irrespective of the condition of switch 82, once relay CR1 is energized.

Relay CR2 is connected between power lines 100 and 102 in series with a normally open contact 122 of relay CR1 and a parallel arrangement of boiling tank low level switch 68 (BTL) and holding tank high level switch 80 (HTH). Switch 68 includes a contact 116 that is engaged by the movable contact of the switch whenever the level in the boiling tank is at a predetermined low level. When the level in the boiling tank rises sufficiently above the predetermined low level, switch 68 becomes open-circuited. Switch 80 includes a contact 118 which is contacted by its movable contact whenever the level in the holding tank rises to a predetermined high level. When the level in the holding tank is sufficiently below the predetermined high level, switch 80 becomes open-circuited.

Feed water solenoid 38 is electrically connected between power lines 100 and 102 through a series connection of normally open contacts 122 from relay CR1 and 123 from relay CR2. Heater 14 is connected between power lines 100 and 102 through a series connection of contact 122 from CR1, a normally closed contact 140 from CR2, and the boiling tank over temperature thermostat 16. Fan 28 is electrically connected in parallel with heater 14 and thermal overload switch 16. Therefore, fan 28 will be energized to cool the condenser whenever the circuit is attempting to apply power to heater 14, even if thermostat 16 has opened upon a high temperature condition in the boiling tank.

Motorized drain valve 40 is connected between power lines 100 and 102 in series with a normally closed contact 126 of CR1 and a normally closed manual switch 128. In this embodiment, drain valve 40 changes from a closed condition to an open condition when power is applied to it (N.C.). Therefore, drain valve 40 is closed when relay CR1 is energized and opened when relay CR1 is not energized. In this embodiment, distilled water pump 30 is directly connected between power lines 100 and 102. Distilled water outlet pump 30 is of the type which responds to a drop in pressure at the outlet port and automatically activates the pump. Such pumps are commercially available and are sold by Shurflo, Inc., of Anaheim, Calif. under Model No. 2152-07-982-14.

In operation, assuming for starting purposes that both the boiling tank and the holding tank are empty, switches 70 and 82 will be closed and relay CR1 energized. Drain valve 40 will close. With relay CR1 energized and switch 68 closed due to the lack of water in the boiling tank, relay CR2 will energize. This will provide power to feed water solenoid 38 through contact 123 and untreated feed water will be admitted to the boiling tank. When the level of water in the boiling tank reaches the level at which switch 68 opens in response to movement of float 60, relay CR2 will become deenergized. With relay CR2 deenergized and relay CR1 energized, power is applied to heater 14 and fan motor 28. Heater 14 will convert the untreated water in boiling tank 12 to steam, which will be condensed in condenser 20, and added as distilled water to the holding tank 26. The level of water in the boiling tank will decrease and eventually again close switch 68. When switch 68 closes, with relay CR1 still energized, relay CR2 will energize. This will cause power to be removed from heater 14 and fan 28 and be applied to feed water solenoid 38. Additional feed water will be supplied to the boiling tank until switch 68 again opens to deenergize relay CR2.

This cycle continues until the level of distilled water in the holding tank rises to a predetermined high level which will cause switch 80 to close. When this occurs, relay CR2 will be energized regardless of the state of switch 68. With relay CR2 held in an energized state, feed water solenoid 38 is opened and feed water is admitted to the boiling tank even after switch 68 opens. Once the level of feed water in the boiling tank reaches a predetermined high level, switch 70 will open causing relay CR1 to deenergize. When relay CR1 deenergizes, contact 122 is open and line 120 is deenergized, this deenergizes the feed water solenoid 38, heater 14 and fan 28 to discontinue the production of distilled water. In addition, the deenergizing of relay CR1 causes normally closed contact 126 to change from an open to a closed circuit position. This energizes drain valve 40 which opens and drains the content of the boiling tank. When the level of water in the boiling tank drops to a sufficiently low level, switches 70 and 68 will close. However, because the level of distilled water in the holding tank is sufficiently high to keep switch 82 open, relay CR1 will not energize and, therefore, relay CR2 cannot energize and no steam will be produced. Eventually, the repeated removal of distilled water from the holding tank will cause switch 82 to close. This will energize relay CR1 and the distillation unit 10 will again produce distilled water which will be deposited in holding tank 26.

After repeated operation of water distillation unit 10 to produce distilled water, mineral scale will build up on the interior of the boiling tank 12 and on the heating means 14. In order to remove this mineral scale, a mode switch 110 is provided in the FIG. 6 embodiment. In order to place the unit in a cleaning mode, mode switch 110 is manually opened. Thereafter, relay CR1 cannot be energized and the unit may not be utilized to produce distilled water. Because relay CR1 is deenergized in the cleaning mode, contact 126 will be closed and the normally closed drain valve 40 will be opened, draining the boiling tank. A manual drain switch 128 is provided to manually close drain valve 40 by opening the circuit to the drain valve. With drain valve 40 manually closed by switch 128, a feed water override switch 130 may be manually closed to energize the feed water solenoid 38. Closing feed water override switch 130 will cause feed water solenoid 38 to open, admitting water to the boiling tank until the level of water in the boiling tank reaches a predetermined high level, at which time switch 70 will open to deenergize solenoid 38. Descaling chemicals may then be added to the boiling tank and the unit soaked for the desired time period. Switches 128 and 130 may be used in a similar sequence to drain and rinse the boiling tank. When mode switch 110 is again closed, the unit is placed in the distilled water production mode and distilled water is produced, as described above.

Figure 7:
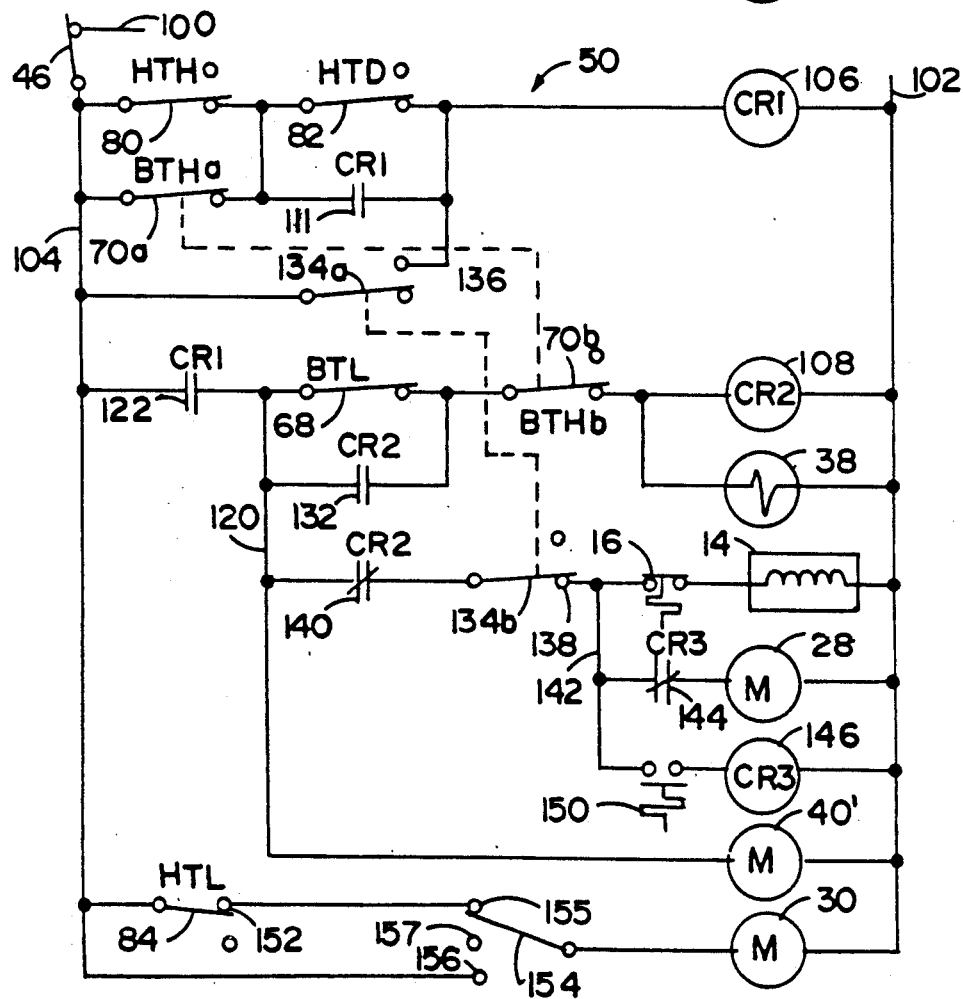
FIG. 7 is an electrical schematic diagram of an alternative embodiment of a control according to the invention.

Another embodiment of the invention is shown in FIG. 7 wherein control assembly 50' has a power switch 46 to selectively apply power from power line 100 to bus 104. Also, the holding tank high level switch 80 (HTH) is placed in parallel with the boiling tank high switch, 70a [BTHa]. Also, relay CR2 is energized through contact 122 of CR1 in a series connection with the boiling tank low switch 68 (BTL) and second boiling tank high level switch 70b [BTH(b)]. A contact 132 of CR2 is placed in parallel with switch 68 to latch CR2 in an energized state, once it is energized, irrespective of the condition of switch 68. In this embodiment, feed water solenoid 38 is connected in parallel with relay CR2 and is, therefore, energized to admit feed water to the boiling tank whenever CR2 is energized.

In the embodiment illustrated in FIG. 7, a mode switch 134 includes a pair of switches 134a and 134b that are mechanically linked to operate together. Switch 134a is connected to bus 104 and has a contact 136 directly connected to relay CR1. Switch 134a is in a closed state connected to CR1 in the clean mode and in an open state in the water production mode. Switch 134b is connected between normally closed contact 140 of CR2 and a line 142 which is connected to contact 138 of switch 134b. Switch 134b is in an open state in the clean mode and in a closed state in the water production mode. Line 142 is, in turn, connected to heater 14 through thermostat 16 and through a normally closed contact 144 to condenser cooling fan 28. Contact 144 is operated by a relay 146, which is designated CR3. Relay 146 is, in turn, connected to line 142 through a manually operable, normally closed, manually resettable thermostat 150, which opens at a predetermined temperature level, mounted to a sidewall of holding tank 26 (see FIG. 1).

In the embodiment shown in FIG. 7, drain valve 40' is of the type that is open when deenergized and closed when energized and is connected directly between lines 104 and 102, through contact 122 of relay CR1. Therefore, when relay CR1 is energized, drain valve 40 is closed. Additionally, a holding tank low level switch 84 (HTL) is provided in series with distilled water outlet pump 30 and has a contact 152 that is contacted by the movable contact as long as the water in the holding tank 26 is above a predetermined low level. If the water in the holding tank drops below thee predetermined low level, switch 84 changes to an open state and disables distilled water outlet pump 30.

A pump override switch 154 is provided in series with pump 30. The movable contact of switch 154 is normally connected with contact 155 thereof. In this position, outlet pump 30 is connected to power line 104 through switch 84. Switch 154 also has a contact 157 that is not connected to the circuit and represents and isolate position. On first starting up after installation switch 154 is placed in the isolate position engaged with contact 157. This prohibits the demand pump from starting up automatically when the water level in the holding tank exceeds the minimum level for pump operation. This will occur quite some time after start up and will most likely be when the unit is unobserved so that a problem with a plumbing connection would go unnoticed. After starting unit 10 with switch 154 in the isolate position, the installer can return to the installation at a convenient time and test the connections downstream of the pump for leaks by placing switch 154 in the AUTO position engaged with contact 155. Switch 154 has an additional contact 156 that the movable contact thereof may be manually connected to in order to bypass the holding tank low level switch in order to operate the outlet pump sufficiently to drain the entire holding tank if it is desired to do so. When it is necessary to fully drain the holding tank, for example to steam clean the holding tank, the pump switch 154 should be placed in the override position and a faucet turned on downstream of the pump. The switch should then be immediately returned to the isolate or AUTO position.

As explained above, the switch actuator arm 66 of the boiling tank level monitor assembly is illustrated as extending from shaft 62 in a laterally opposite direction than the float 60 (FIGS. 2 and 5). The reason is that, in the embodiment illustrated in FIG. 7, the boiling tank high level switch 70 is a double-pole switch, or two gauged switch. Such a switch requires twice the actuating force of a single-pole switch. The illustrated arrangement of the boiling tank level monitor provides the weight of arm 66 in addition to the buoyancy of float 60 to assist in actuating the boiling tank high level switch 70.

Control 50' in FIG. 7 operates as follows. With power switch 46 in the open-circuited position, no power is applied to line 104. Accordingly, drain valve 40' will be deenergized and thus in an open position. Accordingly, the boiling tank 12 will be empty. When power switch 46 is closed, line 104 is energized and as soon as the level of distilled water in holding tank 26 drops to a predetermined intermediate level, switch 82 will close. A path will be completed between CR1 and line 104 through switches 70a and 82. As soon as CR1 pulls in, contact 111 will close providing continuity around switch 82 regardless of the position of switch 82. Energizing CR1 will also cause contact 122 to close which will energize line 120. Because there is no water in the boiling tank, switches 68 and 70b will be closed thus energizing relay CR2 and feed water solenoid 38. The power on line 120 will additionally energize drain valve 40' which will close causing the level of untreated water in the boiling tank to rise. The rising level of water in the boiling tank will cause the boiling tank low level switch 68 to open. This will not deenergize relay CR2 and feed water solenoid 38 because contact 132 in parallel with switch 68 has already been closed.

The water level in the boiling tank will continue to rise until it reaches a predetermined high level at which time switches 70a and 70b will open. Switch 70a does not have any affect upon relay CR1 as long as the level of distilled water in the holding tank has not risen to a sufficiently high level to also open switch 80. The opening of switch 70b will cause relay CR2 and feed water solenoid 38 to be deenergized, discontinuing the addition of feed water to the boiling tank. With relay CR2 deenergized, line 142 will be energized through normally closed contact 140, applying power to heater 14 through thermostat 16. Because steam clean manual reset thermostat 150 will be open, relay CR3 will be deenergized and normally closed contact 144 will be closed providing power from line 142 to energize fan 28. The operation of heater 14 and fan 28 will convert the untreated water in the boiling tank to steam and from steam to distilled water which will be deposited in the holding tank.

The level of water in the boiling tank will drop, first closing boiling tank high level switches 70a and 70b and eventually closing boiling tank low level switch 68. When switches 70b and 68 are both closed, relay CR2 and feed water solenoid 38 will again energize causing heater 14 and fan 28 to be deenergized and feed water to be admitted to the boiling tank. The level of water in the boiling tank will rise until it reaches a predetermined high level, at which time switches 70a and 70b will open and the above-described batch cycling process will be repeated.

The production of distilled water will cause the level of water in the holding tank 26 to rise. As previously mentioned, the opening of holding tank intermediate level switch 82 due to the rising level in the holding tank, will not cause relay CR1 to drop out because contact 111 will bypass switch 82 once CR1 is energized. The periodic opening and closing of switch 70a during the above-described batch cycling of the boiling tank will also not cause relay CR1 to drop out because holding tank high level switch 80, in parallel with switch 70a, will be closed to maintain continuity between CR1 and line 104 as long as the level of water in holding tank 26 is below a predetermined high level.

Eventually, the production of distilled water will cause the level in the holding tank to rise to a predetermined high level at which time switch 80 will open. The opening of switch 80 will not immediately deenergize relay CR1 unless it opens precisely at the same relatively short duration that switch 70a is open, which occurs when the water level in the boiling tank is at a high level. If switches 80 and 70a open simultaneously, then relay CR1 will be immediately deenergized. If, however, switch 70a is closed when switch 80 opens, as will be the usual situation, relay CR1 will stay pulled in and production of distilled water will continue. When the level of untreated water in the boiling tank drops, through the production of steam to the predetermined low level, switch 68 will eventually close and relay CR2 and feed water solenoid 38 will become energized, admitting feed water to the boiling tank and simultaneously lowering the temperature and increasing the level of water in the boiling tank. Eventually, switch 70a will open. Because switch 80 is already open, CR1 will be deenergized. When CR1 drops out, contact 122 will open and line 120 will be deenergized. With line 120 deenergized, normally open drain valve 40 will open causing the contents of the boiling tank to be discharged to the house drain. Thus, even when holding tank 26 is at its high level, as determined by level monitor 58 and switch 80, control 50' will complete production of the batch of distilled water that is in the partially full boiling tank.

The advantage of the embodiment in FIG. 7 over that in FIG. 6 is that, upon a determination by holding tank level monitor 58 that the demand for distilled water has been met, the production of distilled water is not immediately terminated. Rather, the production continues until the level of water in the boiling tank completes a cycle of dropping to a sufficiently low level to close the boiling tank low level switch 68 and refilling the level of water in the boiling tank to a predetermined high level. The level of water in the boiling tank is thus reduced to a minimum level before being diluted with incoming feed water thereby conserving energy by using the heated water before batch dumping. When the level of water in the boiling tank is then increased to the predetermined high level prior to dumping, maximum dilution is assured to minimize discharge temperature. Because feed water is only added to the boiling tank in full batches, the frequency of vacuum creation, which reduces efficiency by returning steam and distilled water to the boiling tank, is kept low. In order to accommodate the additional batch of distilled water that is at least partially produced beyond the moment when holding tank high level switch 80 opens, sufficient capacity must be provided in the holding tank above the predetermined high level to receive this additional distilled water. This additional storage capacity is readily developed by suitable adjustment of the relationship between holding tank switch actuator 76 and holding tank high level switch 80.

Drain valve 40' will be open and the boiling tank empty as long as the level of distilled water in the holding tank is sufficiently high to keep demand switch 82 open. When the level of water in the holding tank decreases through consumption to a predetermined intermediate level, switch 82 will close and the previously-described sequence will be repeated. Should the consumption of water from the holding tank exceed the production capability of the unit, the level in the holding tank will drop. If the level drops sufficiently low, holding tank low level switch 84 will eventually open disabling the distilled water outlet pump 30 from operating in response to a drop in pressure at its outlet. The purpose of switch 84 is to prevent outlet pump 30 from "running dry", which may damage its operation. Override switch 154 may be manually engaged in order to allow pump 30 to be operated briefly notwithstanding the position of switch 84, if it is desired to completely drain the holding tank.

In order to clean the unit in FIG. 7, mode switch 134 is moved to the cleaning position. In this position, the movable contact of switch 134a will engage contact 136, closing the switch. The movable contact of switch 134b will disengage contact 138 causing switch 134b to open. With switch 134a closed, relay CR1 will be energized. With relay CR1 energized, drain valve 40' will close if it is open. Unless the level of water is already at a predetermined high level in the boiler, switches 68 and 70b will be closed and feed water solenoid 38 will be energized, admitting feed water to the boiling tank to the predetermined high level, at which point switch 70b will open and feed water solenoid 38 will be deenergized. Because switch 134b is in the open position, deenergizing relay CR2 will not cause heater 14 and fan 28 to be energized. Rather, the unit will be quiescent. In this state, descaling chemicals may be added to the boiling tank to remove scale therefrom. After the chemicals have soaked the interior of the boiling tank for a predetermined time period, the tank may be emptied merely by opening the power switch 46. This will remove power from line 104 and deenergize drain valve 40' which will open. In order to refill the boiling tank in the cleaning mode for rinsing purposes, power switch 46 need only be closed. Drain valve 40' will be energized closed and feed water solenoid 38 will admit water to the boiling tank until the level rises to the predetermined high level. To then dump the rinse water, switch 46 is again opened. The unit may then be returned to the distilled water production mode by moving switch mode 134 from the cleaning position to the water production position.

If it is desired to steam clean the holding tank, it should first be emptied by placing switch 154 in the override position engaged with contact 156 and by opening a faucet downstream. Switch 154 should then be returned to the AUTO position engaged with contact 155. Manual reset thermostat 150 is then reset with the mode switch being in the distilled water production mode. When the boiling tank has filled with water and relay CR2 deenergized, heater 14 and relay CR3 will be energized. With relay CR3 energized, normally closed contact 144 will open and fan 28 will be deenergized. In this mode, steam produced by the boiling tank will not substantially condense in the condenser but, rather, will pass to the holding tank to steam clean it. The temperature in the holding tank will rise until it reaches the set point of thermostat 150 at which time thermostat 150 will open and deenergize relay CR3 which will energize fan 28 to automatically terminate the steam clean mode and produce distilled water. Thermostat 150 is of the manual reset type which must be manually reset in order to once again place the unit in a steam clean mode.

In the embodiment in FIG. 7, the level of water in the holding tank is returned to a predetermined high level whenever it drops to a predetermined low level during the production of distilled water. The level in the boiling tank is then automatically increased to the predetermined high level and the production of distilled water continues as long as the demand from the holding tank continues. If the demand from the holding tank has terminated in the previous batch, the drain valve will open and the contents of the boiling tank, which are diluted by the admission of feed water to significantly reduce its temperature, is discharged to drain. This batch filling of the boiling tank reduces energy consumption because, once the temperature of the untreated water in the boiling tank has been elevated sufficiently to produce steam, the dilution and dumping of the residue of the boiling tank will not occur until that water batch has been completely converted to steam. The admission of feed water to the boiling tank in batches additionally simplifies and reduces the number of control switches necessary to clean the tank. Further, a steam cleaning mode is provided that is self-terminating.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows.

1. A method for controlling the operation of a water distillation apparatus having a boiling tank, heating means for converting water in said boiling tank to steam, feed water admission means for admitting untreated feed water to said boiling tank, draining means for removing the contents of said boiling tank, condensing means for condensing steam produced by said heating means into distilled water, and a distilled water holding tank operatively connected to said condensing means to receive water therefrom, said method comprising the steps of:

(a) monitoring the level of distilled water in said holding tank and the level of untreated water in said boiling tank;

(b) processing a batch of untreated water by operating said heating means when said level of water in said boiling tank is above a first predetermined level to produce distilled water irrespective of the level of distilled water in said holding tank;

(c) filling said boiling tank with a batch of untreated water by operating said feed water admission means when the level of water in said boiling tank decreases to said first level as a result of operating said heating means until said level of water in said boiling tank reaches a second predetermined level higher than said first level; and (d) diluting the untreated water in said boiling tank and discharging a batch of tempered untreated water by operating said draining means after said level in said boiling tank increases to said second level as a result of operating said feed water admission means in step (c) when the level of water in said holding tank increases to a third predetermined level as a result of producing distilled water.

2. The method in claim 1 in which said holding tank has sufficient capacity above said third level to receive distilled water produced during said steps (b) and (c).

3. A method for controlling the operation of a water distillation apparatus having a boiling tank, heating means for converting water in said boiling tank to steam, feed water admission means for admitting untreated feed water to said boiling tank, draining means for removing the contents of said boiling tank, and condensing means for condensing steam produced by said heating means into distilled water, and a distilled water holding tank operatively connected to said condensing means to receive water therefrom, said method comprising the steps of:

monitoring the level of water in said boiling tank;

filling said boiling tank with a batch of untreated water by operating said feed water admission means when said level of water in said boiling tank drops to a first predetermined level and discontinuing said operating of said feed water admission means when said level of water in said boiling tank rises to a second predetermined level higher than said first level as a result of operating said feed water admission means;

monitoring the level of distilled water in said holding tank;

processing a batch of untreated water by operating said heating means to produce distilled water in response to said level of water in said boiling tank rising to said second level as a result of operating said feed water admission means, provided that said level of distilled water in said holding tank is below a third predetermined level as a result of demand for distilled water, said operating of said heating means continuing at least until the production of water causes said level of water in said boiling tank to decrease to said first predetermined level;

diluting said water in said boiling tank and discharging a batch of tempered untreated water by operating said draining means when said level of water in said boiling tank rises to said second level in response to said operating of said feed water admission means if said level of water in said holding tank has increased to said third level as a result of the production of distilled water.

4. A method for controlling the operation of a water distillation apparatus having a boiling tank, heating means for converting water in said boiling tank to steam, feed water admission means for admitting untreated feed water to said boiling tank, draining means for removing the contents of said boiling tank, and condensing means for condensing steam produced by said heating means into distilled water, and a distilled water holding tank operatively connected to said condensing means to receive water therefrom, said method comprising the steps of:

monitoring the level of water in said boiling tank;

operating said feed water admission means when said level of water in said boiling tank drops to a first predetermined level;

discontinuing said operating of said feed water admission means when said level of water in said boiling tank rises to a second predetermined level higher than said first level as a result of operating said feed water admission means;

monitoring the level of distilled water in said holding tank;

operating said heating means to produce distilled water in response to said level of water in said boiling tank rising to said second level as a result of operating said feed water admission means, provided that said level of distilled water in said holding tank is below a third predetermined level as a result of demand for distilled water;

operating said draining means when said level of water in said boiling tank rises to said second level in response to said operating of said feed water admission means if said level of water in said holding tank has increased to said third level as a result of the production of distilled water; and selectively cleaning said boiling tank by disabling said heating means and by depositing cleaning chemicals in said boiling tank in response to said level of water in said boiling tank by disabling said heating means and by depositing cleaning chemicals in said boiling tank in response to said level of water in said boiling tank rising to said second level as a result of operating said feed water admission means.

5. The method in claim 4 in which said draining means is a valve which is open when deenergized and wherein said step of selectively cleaning includes, removing power from said valve to drain said boiling tank.

6. A method of controlling a water distillation apparatus having a boiling tank, heating means for converting water in said boiling tank to steam, feed water admission means for admitting untreated feed water to said boiling tank, a drain valve in said boiling tank for draining water from said boiling tank, condensing means for condensing steam produced by said heating means into distilled water, and a holding tank operatively connected with said condensing means to receive said distilled water, said method comprising the steps of:

monitoring the levels of untreated water in said boiling tank and the level of distilled water in said holding tank;

filling said boiling tank with a batch of untreated feed water by operating said feed water admission means to increase the level of untreated water in said boiling tank to a predetermined high level when said level of untreated water in said boiling tank decreases to a predetermined low level as a result of energizing said heating means;

processing a batch of untreated water by energizing said heating means when said level of untreated water in said boiling tank increases to said predetermined high level as a result of operating said feed water admission means provided that said level of distilled water in said holding tank is within a predetermined intermediate range of levels, said energizing continuing at least until said energizing causes the level of untreated water in the boiling tank to decrease to said predetermined low level; and diluting said untreated water in said boiling tank and discharging a batch of tempered untreated water by opening said drain valve when said level of untreated water in said boiling tank increases to said predetermined high level as a result of operating said feed water admission means provided that said level of water in said holding tank is above said intermediate range of levels.

7. The method in claim 6 further including the step of deenergizing said heating means when said level of untreated water in said boiling tank decreases to said predetermined low level.

8. A water distillation apparatus having a control, a boiling tank, heating means for converting water in said boiling tank to steam, feed water admission means for admitting untreated feed water to said boiling tank, draining means for removing the contents of said boiling tank, condensing means for condensing steam produced by said heating means into distilled water and a holding tank operatively connected with said condensing means for holding distilled water, said control comprising:
  first monitoring means for monitoring the level of untreated water in said boiling tank;
  second monitoring means for monitoring the level of distilled water in said holding tank;
  water level control means responsive to said first monitoring means for filling said boiling tank with a batch of untreated feed water by operating said feed water admission means when said level of untreated water in said boiling tank drops to a predetermined low level and discontinuing said operation of said feed water admission means when said level of untreated water in said boiling tank increases to a predetermined high level;
  batch production means responsive to said water level control means and said second monitoring means for processing a batch of untreated feed water by energizing said heating means when said level of distilled water in said holding tank is below a given level and said water level control means is not operating said feed water admission means and for deenergizing said heating means only when said water level control means is operating said feed water admission means in response to said level of untreated water in the boiling tank decreasing to the predetermined low level;
  batch dilution and discharge means responsive to said first and second monitoring means for operating said draining means and inhibiting said water level control means from operating said feed water admission means and said production means from energizing said heating means when said production means determines that demand for the production of distilled water has ceased as a result of said level of water in said holding tank being above said given level and said water level of untreated water in said boiling tank is at said predetermined high level, whereby said control will drain said boiling tank only after a complete batch of untreated water has been converted to steam and the boiling tank has been refilled to substantially cool the water in the boiling tank before discharging the water to drain.

9. A water distillation apparatus having a control, a boiling tank, heating means for converting water in said boiling tank to steam, feed water admission means for admitting untreated feed water to said boiling tank, draining means for removing the contents of said boiling tank, condensing means for condensing steam produced by said heating means into distilled water and a holding tank operatively connected with said condensing means for holding distilled water, said control comprising:
  first monitoring means for monitoring the level of untreated water in said boiling tank;
  second monitoring means for monitoring the level of distilled water in said holding tank;
  water level control means responsive to said first monitoring means for operating said feed water admission means when said level of untreated water in said boiling tank drops to a predetermined low level and discontinuing said operation of said feed water admission means when said level of untreated water in said boiling tank increases to a predetermined high level;
  production means responsive to said water level control means and said second monitoring means for energizing said heating means when said level of distilled water in said holding tank is below a given level and said water level control means is not operating said feed water admission means and for deenergizing said heating means when said water level control means is operating said feed water admission means;
  means responsive to said first and second monitoring means for operating said draining means and inhibiting said water level control means from operating said feed water admission means and said production means from energizing said heating means when said production means determines that demand for the production of distilled water has ceased as a result of said level of water in said holding tank being above said given level and said water level of untreated water in said boiling tank is at said predetermined high level, whereby said control will drain said boiling tank only after a complete batch of untreated water has been converted to steam and the boiling tank has been refilled to substantially cool the water in the boiling tank before discharging the water to drain; and
  mode control means for selectively operating said apparatus in a first distilled water production mode and a second cleaning mode, said mode control means having inhibiting means for inhibiting said production means and said draining means when said mode control means is in said second mode, whereby said boiling tank will be filled to said predetermined high level when said mode control is in said second mode.

10. The apparatus in claim 9 in which said draining means comprises a valve that is open when deenergized and said control further including a control power switch for selectively removing power from said control, whereby, with said mode control means in said second mode and said power switch set to remove power from said control, said boiling tank will be drained.

11. A water distillation apparatus having a control, a boiling tank, a heater in said tank, a feed water admission valve connected to said tank, a drain valve connected to a lower portion of said tank, a distilled water holding tank, a condenser having a first end connected to said boiling tank and a second end connected to said holding tank, cooling means for cooling said condenser and outlet means for removing distilled water from said holding tank, said control comprising:
  first monitoring means for providing a first signal when the level of untreated water in said boiling tank is at a predetermined low level and a second signal when said level of untreated water is at a predetermined high level;

second monitoring means for providing a third signal when the level of distilled water in said holding tank is at a predetermined intermediate level and a fourth signal when said level of distilled water is at a predetermined high level;

batch production latch means for producing distilled water in batches, set in response to said third signal and cleared in response to said second and fourth signals occurring together such that the production of distilled water will occur in batches and will proceed to completion of a batch irrespective of changes in said fourth signal;

means for closing said drain valve and opening said feed water admission valve in response to the combination of said batch initiation latch means being set and said first signal being provided;

means for closing said admission valve in response to said second signal;

heater energizing means for energizing said heater in response to the combination of said second signal and said batch initiation latch means being set;

means for deenergizing said heater and opening said drain valve in response to the combination of said second signal and said batch initiation latch means being cleared.

12. The apparatus in claim 11 in which said heater energizing means further includes means for deenergizing said heater in response to said first signal.

13. A water distillation apparatus having a control, a boiling tank, a heater in said tank, a feed water admission valve connected to said tank, a drain valve connected to a lower portion of said tank, a distilled water holding tank, a condenser having a first end connected to said boiling tank and a second end connected to said holding tank, cooling means for cooling said condenser and outlet means for removing distilled water from said holding tank, said control comprising:

first monitoring means for providing a first signal when the level of untreated water in said boiling tank is at a predetermined low level and a second signal when said level of untreated water is at a predetermined high level, said first monitoring means including a float pivotally mounted in said boiling tank by a rotatable shaft passing through a wall of said boiling tank, an arm mounted to said shaft external of said boiling tank and a pair of microswitches mounted adjacent said arm, one of said microswitches providing said first signal upon being actuated by said arm and the other one of said microswitches providing said second signal upon being actuated by said arm;

second monitoring means for providing a third signal when the level of distilled water in said holding tank is at a predetermined intermediate level and a fourth signal when said level of distilled water is at a predetermined high level;

batch initiation latch means for initiating the production of distilled water, set in response to said third signal and cleared in response to said second and fourth signals occurring together;

means for closing said drain valve and opening said feed water admission valve in response to the combination of said batch initiation latch means being set and said first signal being provided;

means for closing said admission valve in response to said second signal;

heater energizing means for energizing said heater in response to the combination of said second signal and said batch initiation latch means being set; and means for deenergizing said heater and opening said drain valve in response to the combination of said second signal and said batch initiation latch means being cleared.

14. The apparatus in claim 13 in which said other one of said microswitches is a double-pole switch and said arm is mounted to said shaft laterally opposite of said float so that the weight of the arm assists the actuation of said other one of said microswitches.

15. A water distillation apparatus having a control, a boiling tank, a heater in said tank, a feed water admission valve connected to said tank, a drain valve connected to a lower portion of said tank, a distilled water holding tank, a condenser having a first end connected to said boiling tank and a second end connected to said holding tank, cooling means for cooling said condenser and outlet means for removing distilled water from said holding tank, said control comprising:

first monitoring means for providing a first signal when the level of untreated water in said boiling tank is at a predetermined low level and a second signal when said level of untreated water is at a predetermined high level;

second monitoring means for providing a third signal when the level of distilled water in said holding tank is at a predetermined intermediate level and a fourth signal when said level of distilled water is at a predetermined high level, said second monitoring means including a float pivotally mounted in said holding tank by a rotatable shaft passing through a wall of said holding tank, an arm mounted by a first end to said shaft external of said holding tank, and a pair of microswitches mounted adjacent said arm, one of said pair of microswitches providing said third signal upon being actuated by said arm and the other one of said pair of microswitches providing said fourth signal upon being actuated by said arm, said arm further including a second opposite end and a pair of sides between said ends, wherein said second end actuates said one of said pair of microswitches and one of said sides actuates said other one of said pair of microswitches;

batch initiation latch means for initiating the production of distilled water, set in response to said third signal and cleared in response to said second and fourth signals occurring together;

means for closing said drain valve and opening said feed water admission valve in response to the combination of said batch initiation latch means being set and said first signal being provided;

means for closing said admission valve in response to said second signal;

heater energizing means for energizing said heater in response to the combination of said second signal and said batch initiation latch means being set; and means for deenergizing said heater and opening said drain valve in response to the combination of said second signal and said batch initiation latch means being cleared.

16. The apparatus in claim 15 in which said second monitoring means further includes means for providing a fifth signal when said level of distilled water is at a predetermined low level, said means for providing a fifth signal comprising a microswitch actuated by the other of said second arm sides.

17. The apparatus in claim 16 in which said outlet means comprises a pump and said control further includes disabling means for disabling said pump in response to said fifth signal.

18. The apparatus in claim 11 further including mode control means for selectively operating said apparatus in a first distilled water production mode and a second cleaning mode, said mode control means having means for setting said batch initiation latch irrespective of said signals and for disabling said heater energizing means when said mode control is in said second mode, whereby said boiling tank will be filled to the predetermined high level when said mode control means is.

19. The apparatus in claim 18 in which said drain valve is open when deenergized and said control further including a control power switch for selectively removing power from said control, whereby with said mode control means in said second mode and said power switch set to remove power from said control, said drain valve will be open and said boiling tank will be drained.

20. The method in claim 1 wherein step (c) includes terminating operation of said heating means.

21. The method in claim 20 wherein step (d) includes inhibiting operation of said heating means.

22. The method in claim 1 wherein step (d) includes terminating operation of said heating means.

* * * * *

UNITED STATES PATENT AND TRADEMARK OFFICE
CERTIFICATE OF CORRECTION

PATENT NO. : 5,021,128

DATED : 06/04/91

INVENTOR(S) : David G. Palmer

It is certified that error appears in the above-identified patent and that said Letters Patent is hereby corrected as shown below:

Column 2, Line 62:
 "&:he" should be --the--.

Column 3, Line 30:
 "Ievel" should be --level--.

Signed and Sealed this

Thirteenth Day of April, 1993

Attest:

STEPHEN G. KUNIN

*Attesting Officer*    Acting Commissioner of Patents and Trademarks

UNITED STATES PATENT AND TRADEMARK OFFICE
CERTIFICATE OF CORRECTION

PATENT NO. : 5,021,128
DATED : June 4, 1991
INVENTOR(S) : David G. Palmer

It is certified that error appears in the above-indentified patent and that said Letters Patent is hereby corrected as shown below:

Column 19, claim 18, lines 15 & 16:
After "is" insert --placed in said second mode.--.

Signed and Sealed this

Twenty-ninth Day of June, 1993

Attest:

MICHAEL K. KIRK

*Attesting Officer*     *Acting Commissioner of Patents and Trademarks*